United States Patent [19]

Graber et al.

[11] Patent Number: 5,086,862
[45] Date of Patent: Feb. 11, 1992

[54] APPARATUS FOR STABILIZING POWER STEERING FOR TEMPERATURE EFFECTS

[75] Inventors: David W. Graber, Millington; Dennis C. Eckhardt, Saginaw; Andrzej M. Pawlak, Troy, all of Mich.

[73] Assignee: General Motors Corporation, Detroit, Mich.

[21] Appl. No.: 580,976

[22] Filed: Sep. 12, 1990

[51] Int. Cl.[5] .............................................. B02D 5/04
[52] U.S. Cl. .................................. 180/132; 180/79.1; 180/142; 318/434; 318/473; 318/599
[58] Field of Search ............... 180/132, 142, 143, 149, 180/79.1; 318/434, 599, 473

[56] References Cited

U.S. PATENT DOCUMENTS

| | | | |
|---|---|---|---|
| 4,730,687 | 3/1988 | Chikuma et al. | 180/143 X |
| 4,789,040 | 12/1988 | Morishita et al. | 180/142 |
| 4,871,040 | 10/1989 | Zuraski et al. | 180/142 |

Primary Examiner—Mitchell J. Hill
Attorney, Agent, or Firm—Mark A. Navarre

[57] ABSTRACT

A hydraulically assisted power steering system subject to variance in steering effort due to temperature change is compensated to give consistent response at all temperatures. A hydraulic control valve is coupled to an electromagnetic device which controls the steering effort as a function of energization current. The current is adjusted in accordance with temperature to compensate for temperature changes. A microcomputer controller stores empirical data relating to the effect of temperature on steering effort and calculates the current adjustment necessary for any measured system temperature. In one embodiment, the temperature is not measured directly but is derived from the deviation of energization current from the theoretical desired current, which deviation is a function of temperature. The effect of voltage variations is also compensated for.

6 Claims, 2 Drawing Sheets

APPARATUS FOR STABILIZING POWER STEERING FOR TEMPERATURE EFFECTS

FIELD OF THE INVENTION

This invention relates to a vehicular power steering apparatus, and more particularly, to such an apparatus having temperature compensation to result in the same power assist level at different temperatures.

BACKGROUND OF THE INVENTION

The conventional hydraulic power assist steering system comprises a hydraulic actuator for moving the steering linkage in relation to the fluid flow supplied thereto, and a rotary hydraulic control valve assembly for controlling fluid flow to the actuator in relation to the operator exerted steering torque. The control valve generally includes a cylindrical valve body rotatable within the valve housing, and a spool rotatably disposed within the valve body. Hydraulic fluid is supplied to a cavity formed in the spool, and the valve body is grooved to receive fluid flow in relation to the amount of relative rotation between spool and valve body. The fluid so received is then directed to the actuator so that steering assist is developed in relation to the relative rotation of the valve body and spool.

The spool is manually rotated by the operator of the vehicle and is connected to mechanically drive the steering linkage through a lost motion coupling. A resilient element, such as a torsion bar, couples the spool and valve body to provide a centering force for aligning the spool and valve body, and to permit relative rotation therebetween in relation to operator exerted steering torque, at least within the limitations of the lost motion coupling.

In systems of the type described above, the level of driver steering effort assist required to produce a given level of power assist, depends primarily on the compliance of the torsion bar. If the torsion bar has relatively high compliance, a relatively low level of driver steering effort is required. This is generally desirable in low speed operation of a vehicle where relatively high steering forces are required. If the torsion bar has relatively low compliance, a relatively high level of driver steering effort is required. This is generally desirable in high speed operation of a vehicle where relatively low steering forces are required.

The need to accommodate different steering levels at different speeds has been met by the U.S. Pat. No. 4,871,040 issued Oct. 3, 1989, to Zuraski et al. entitled "Electromagnetic Control Apparatus For Varying The Driver Steering Effort Of A Hydraulic Power Steering System". That patent describes a hydraulic power assist steering system having conventional relatively rotatable spool and valve body elements for flow regulation, and an integral electromagnetic mechanism which defines a coupling of variable resilience between the spool and valve body for adjusting driver steering effort required to produce a given level of power assist. Other solutions for controllability of steering effort are shown in U.S. Pat. No. 4,886;137 issued Dec. 12, 1989, to Pawlak et al. and U.S. Pat. No. 4,886,138 issued Dec. 12, 1989, to Graber et al. Each of these patents teach the use of an electromagnetic mechanism for defining a coupling between the spool and valve body.

In each case, the steering effort can be controlled to a fine degree to achieve design objectives, but is subject to the effects of temperature variability on the system response. Since hydraulic viscosity, properties of magnetic materials, properties of electrical components and mechanical dimensions are all subject to changes with temperature, these characteristics have to be taken into consideration in order to provide adequate compensation for a given temperature and to make steering assist performance uniform at all temperatures to which the steering system is exposed. Although the problem and the solution of this invention apply equally to each of the patents mentioned above, the structure of U.S. Pat. No. 4,871,040 is used herein to describe the invention.

The integral electromagnetic mechanism includes a rotary magnetic circuit and a stationary electromagnetic circuit. The rotary magnetic circuit comprises a pair of relatively rotatable elements, one of which is toothed to conduct magnetic flux and one of which includes permanent magnets for establishing a permanent magnet coupling.

In the illustrated embodiment, the toothed element is defined by a pair of axially displaced magnetic pole pieces, and the permanent magnet element is defined by a disk element disposed between the magnetic pole pieces. The disk element is supported for rotation with the input (operator driven) steering shaft, and the pole pieces are supported for rotation with the output (pinion) steering shaft. The disk element is axially magnetized to define an even number N of radially extending, alternating magnetic polarity sectors. The rotary pole pieces each have N/2 teeth extending toward the respective axial face of the disk element. The stationary electromagnetic circuit comprises at least one annular exciting coil disposed about the rotary magnetic circuit and ferromagnetic pole elements positioned adjacent the rotary magnetic pole pieces.

The above elements define two magnetic flux paths: a permanent magnet flux path which includes (neglecting leakage flux) only the rotary magnetic circuit elements, and an electromagnetic flux path which includes both the stationary and rotary magnetic circuit elements. The rotary pole pieces and the disk element are oriented such that (1) when the assembly is in the centered position, both flux paths are magnetically balanced, and (2) when there is relative rotation of the input and output steering shafts, the flux in the two paths develop in-phase centering forces which tend to restore the assembly to the centered position. The force due to the electromagnetic flux path is variable over a wide range, depending on the magnitude and direction of current supplied to the coil, and such current may be scheduled in relation to the vehicle speed to provide a speed-dependent relationship between the operator input torque and the power assist torque.

In the illustrated embodiment, the mechanism of this invention is used in combination with a conventional torsion bar to define a variable resiliency coupling between the hydraulic fluid supply elements. The combination of the torsion bar and the permanent magnet flux path provide a coupling of intermediate resilience to generate an intermediate level of steering assist for a given driver steering input. Variably energizing the exciting coil with current of one polarity variably increases the resilience of the coupling so that more driver steering effort is required to produce a given level of power assist. Variably energizing the exciting coil with current of the opposite polarity variably decreases the resilience of the coupling so that less driver steering effort is required to produce a given level of power assist. Preferably, the coil energization is scheduled in relation to the speed of the vehicle so that the level of steering assist decreases with increasing vehicle speed. As will be seen below, control of the coil energization is used to carry out compensation for temperature effects on the system. A driver preference input may also be used.

BRIEF DESCRIPTION OF THE DRAWINGS

The above and other advantages of the invention will become more apparent from the following description taken in conjunction with the accompanying drawings, wherein like references refer to like parts.

DESCRIPTION OF THE INVENTION

Figure 1:
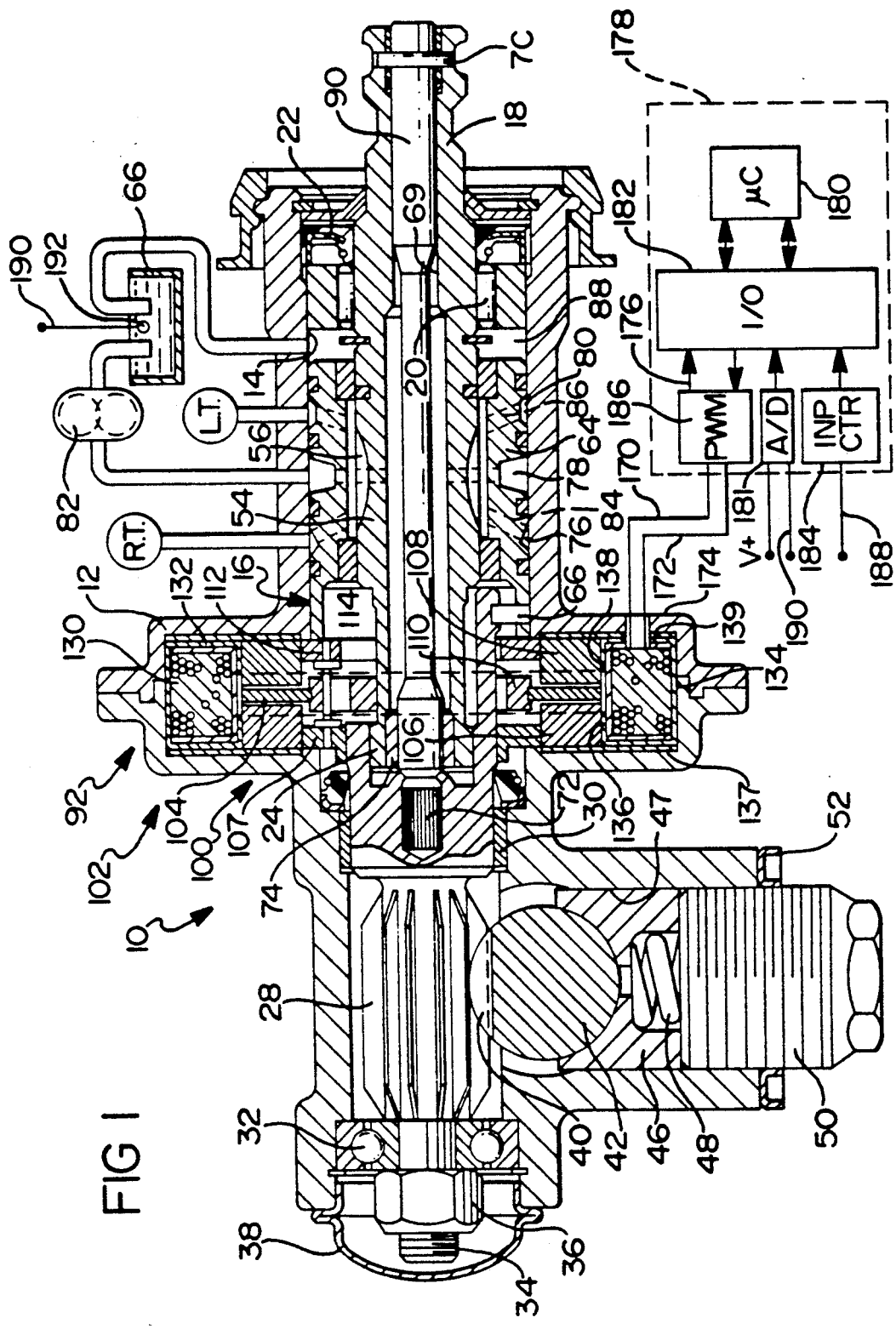
FIG. 1 is a sectional view of a hydraulic control valve assembly incorporating an integral electromagnetic mechanism and a block diagram of a computer-based controller for carrying out the present invention.

Referring to FIG. 1, the reference numeral 10 generally designates a portion of a motor vehicle hydraulic power assist rack and pinion steering gear. The steering gear 10 is disposed within a two-piece housing 12 having a cylindrical smooth wall bore 14 formed therein. A cylindrical rotary power steering gear valve assembly 16, disposed within the bore 14, includes an elongated cylindrical spool shaft 18 mounted for turning movement in the housing 12 by a bearing assembly 20. The inboard end of spool shaft 18 projects through an annular fluid seal 22 for connection to a conventional steering shaft and operator manipulated hand wheel, not shown.

The outboard end of the spool shaft 18 is splined, as indicated by the reference numeral 24, with an elongated pinion gear 28 to define a lost motion mechanical coupling therebetween to allow a limited rotational displacement between the spool shaft 18 and pinion gear 28. The pinion gear 28 is rotatably mounted in the housing 12 by the sleeve bearing 30 and a ball bearing assembly 32 which receives a shank portion 34 of pinion gear 28. A nut 36 threaded onto the outboard end of the shank portion 34 secures the pinion gear 28 with the housing 12. A cup-like cover 38 frictionally fits into the end of the housing 12 to provide service access.

The teeth of pinion gear 28 mesh with the toothed portion 40 of an elongated rack 42 mounted for linear sliding movement within the housing 12. The rack 42 is operatively connected to the steerable wheels of the vehicle by suitable ball joints and tie rods, not shown. In such an arrangement, the linear movement of the rack turns the steerable wheels of the vehicle for vehicle steering purposes.

The rack 42 is also coupled to a fluid-operated power cylinder mechanism or actuator, not shown, for applying a steering assist force to rack 42. As described below, the power steering valve assembly 16 is adapted to direct hydraulic fluid to right or left turn chambers of the power cylinder to apply righthand or lefthand steering assist force to rack 42. A power cylinder meeting the above description is described in detail in U.S. Pat. No. 4,454,801 to Spann, issued June 19, 1984, and assigned to the assignee of the present invention.

Close meshing engagement between the teeth of the pinion 28 and the rack 42 is achieved by the rack contact shoe 46 which is slidably mounted in the housing bore 47. A helical spring 48 seated between the contact shoe 46 and an adjusting plug 50, tensions the contact shoe 46. Plug 50 is threaded into the end of hosing bore 47 and can be axially adjusted therein to vary the spring force. An adjuster plug nut 52 maintains the plug 50 in a selected position.

The spool shaft 18 of the power steering valve assembly 16 has a cylindrical valve spool 54 formed thereon. The spool 54 has a plurality of arcuate, axially extending oil transfer slots 56 formed in the periphery thereof. The valve assembly 16 also includes a cylindrical valve body 64 rotatably mounted within valve bore 14 on the valve spool 54. The outboard end of the valve body 64 extends over the end of the pinion 28 and is drivingly connected thereto by radial pin 66.

The valve body 64 defines right turn, supply and left turn chambers 76, 78, 80 between it and the valve bore 14. A hydraulic pump 82 supplies fluid to the supply chamber 78, and such fluid is directed to the right turn and left turn chambers 76, 80 via the slots 56 of valve spool 54 and the drilled passages 84 and 86, depending on the direction and degree of relative rotation between spool 54 and valve body 64. The right turn and left turn chambers 76, 80 are connected to the right (RT) and left (LT) chambers of the power cylinder (actuator), as indicated, for generating a corresponding level of steering assist force in rack 42 as described above. An exhaust passage chamber 88 returns hydraulic fluid to the fluid reservoir 66 of pump 82. A detailed description of the valve 16 and the hydraulic system thereof is set forth in the above-referenced U.S. Pat. No. 4,454,801.

A resilient centering coupling between the valve spool 54 and valve body 64 is provided by the combined operation of a torsion bar 90 and the electromagnetic mechanism of this invention, generally designated by the reference numeral 92. Within the limits of lost motion allowed by the splined coupling 24, the torsion bar 90 and electromagnetic mechanism 92 together permit the valve spool 54 to be rotated relative to the valve body 64 in relation to the operator exerted steering torque so that the valve 16 directs fluid to the power cylinder (not shown) for producing the desired level of steering assist force. On termination of the operator exerted steering torque, the torsion bar 90 and electromagnetic mechanism 92 center the valve body 64 and spool 54 to terminate steering assist force.

The torsion bar 90 extends concentrically through an axial opening 69 in the spool shaft 18. A cross pin 70 connects the input end of torsion bar 90 to spool shaft 18. The output end of torsion bar 90 is splined and staked at 72 to the pinion 28. Bearing sleeve 74 supports the inner end of the spool shaft 18 on a cylindrical portion of the torsion bar 90.

The electromagnetic mechanism 92 comprises a rotary magnetic circuit and a stationary magnetic circuit, generally designated by the reference numerals 100 and 102, respectively.

The stationary electromagnetic circuit 102 comprises an annular exciting coil 130 wound around the rotary magnetic circuit 100 on a bobbin 132 and a partially encircling ferromagnetic pole element 134. The pole surfaces 136–139 of pole element 134 are positioned in close proximity to the rotary magnetic circuit 100 to facilitate both radial and axial transfer of magnetic flux between the stationary and rotary magnetic circuits 102, 100. The lead ends 170, 172 of coil 130 pass through a suitable opening 174 in the housing 12 and are connected to the computer-based control unit 178, described below.

The rotary magnetic circuit 100 comprises a permanent magnet disk element 104 and a pair of rotary ferromagnetic pole pieces 106, 108. The disk element 104 is secured to a rotor hub 110, which is secured onto the outboard end of spool shaft 18 for rotation therewith. The pole piece 106 is secured onto the inboard end of pinion 28 for rotation therewith via a nonmagnetic spacer 107. A plurality of pins 112 secured into openings in the pole pieces 106, 108 serve to rigidly fasten the pole piece 108 to the pole piece 106, and to establish a predetermined angular alignment therebetween.

A pair of flanges 114 on each pin 112 seat against the pole pieces 106, 108 to establish a predetermined clearance which is somewhat greater than the axial dimension of the disk element 104. The disk element 104 is positioned approximately midway between the pole pieces 106, 108 at the time of assembly.

Further details of the structure and operation of the magnetic circuits and the effects of electromagnetic energization are described in the above mentioned U.S. Pat. No. 4,871,040. It is apparent in any event that the degree of power steering assist is selectively increased or decreased by the proper energization of the excitation coil.

The computer-based control unit 178 of FIG. 1 is supplied with operating power from the vehicle storage battery (not shown), and comprises a microcomputer (uC) 180, an analog to digital converter (A/D) 181, input/output (I/O) device 182, an input counter (INP CTR) 184, and a pulse-width-modulation driver (PWM) 186, all of which may be conventional devices. The microcomputer 180 communicates with the remainder of the system via I/O device 182; in response to various input information, microcomputer 180 executes a series of predetermined program instructions for developing an output command pertaining to the required energization of the exciting coil 130. Program instructions are described below in reference to the flow diagram of FIG. 2.

The primary control unit inputs are an oscillatory vehicle speed signal on line 188, which may be obtained from a conventional speed pickup, not shown, and a temperature signal on line 190 which is obtained from a temperature sensor 192 which is shown in the oil sump 66 but which may be installed elsewhere in the system. The speed signal is applied to the I/O device 182 through the input counter 184, which divides the frequency of the speed signal by a predetermined factor. The temperature signal on line 190, as well as a battery voltage signal V+, is applied to the I/O device 182 through the A/D converter 181. The PWM command for exciting coil 130 is applied to a bidirectional PWM driver 186 (which may take the form of a conventional H-switch driver) for correspondingly modulating the coil 130 with current from the vehicle storage battery, not shown. A signal indicative of the coil current is developed by the PWM driver 186 on line 176 with a suitable current shunt, such signal being applied as an input to an analog port of the I/O device 182 for use in a closed-loop control of the coil current. Open-loop voltage control may alternately be employed, if desired.

Figure 2:
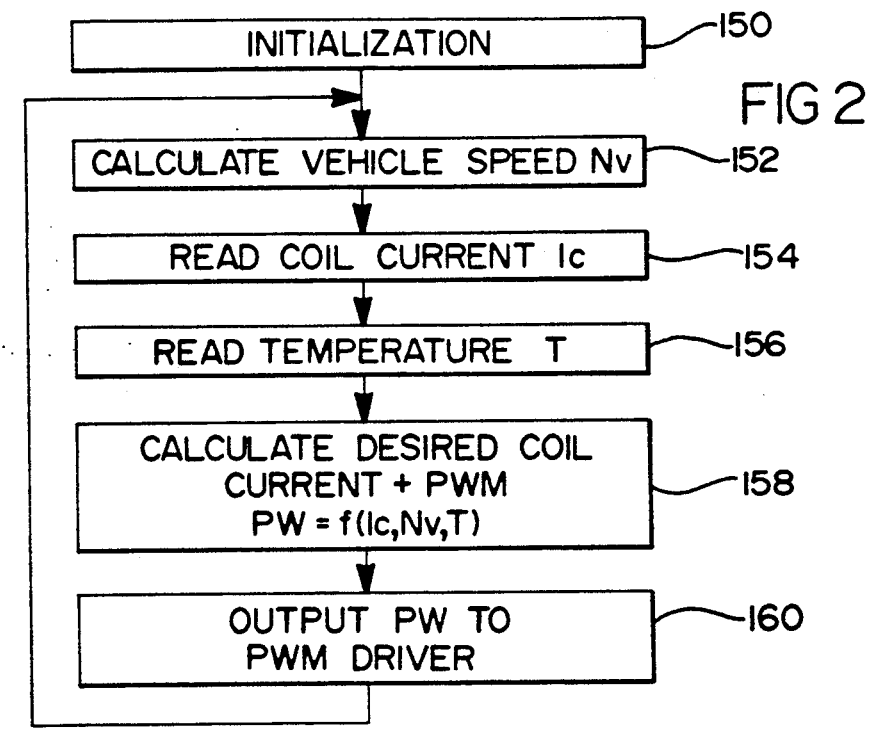
FIG. 2 is a flow chart representing the program for the controller of FIG. 1 according to the invention.

FIG. 2 shows the flow diagram representing computer instructions executed by the microcomputer 180. The block 150 designates a series of program instructions which would be executed at the initiation of each period of vehicle operation for initializing the various registers and program variables to predetermined values. Then the functions of calculating vehicle speed, reading coil current and reading system temperature are carried out by blocks 152, 154 and 156 respectively. Block 158 calculates the desired coil current and the corresponding pulse-width-modulation according to a preset formula which may be incorporated in a look-up table or set up in an algorithm for calculating the desired values. Finally, the calculated pulse width PW is output to the PWM driver to effect the desired coil current. The program returns to block 152 to continue program execution to update the calculation.

The calculation of coil current and pulse-width-modulation in block 158 requires information on the temperature effect on the steering system. The information is determined by experimentally operating the system at different temperatures and determining for each temperature the correction required to achieve a standard steering effort. That correction is stored in a table or as an equation in the microprocessor and is used for the calculation of the current required for the temperature at the time of calculation. In this manner, the steering effort is made independent of the temperature of the steering system even though the fluid viscosity, the electrical and magnetic characteristics and mechanical dimensions all change with temperature.

Figure 3:
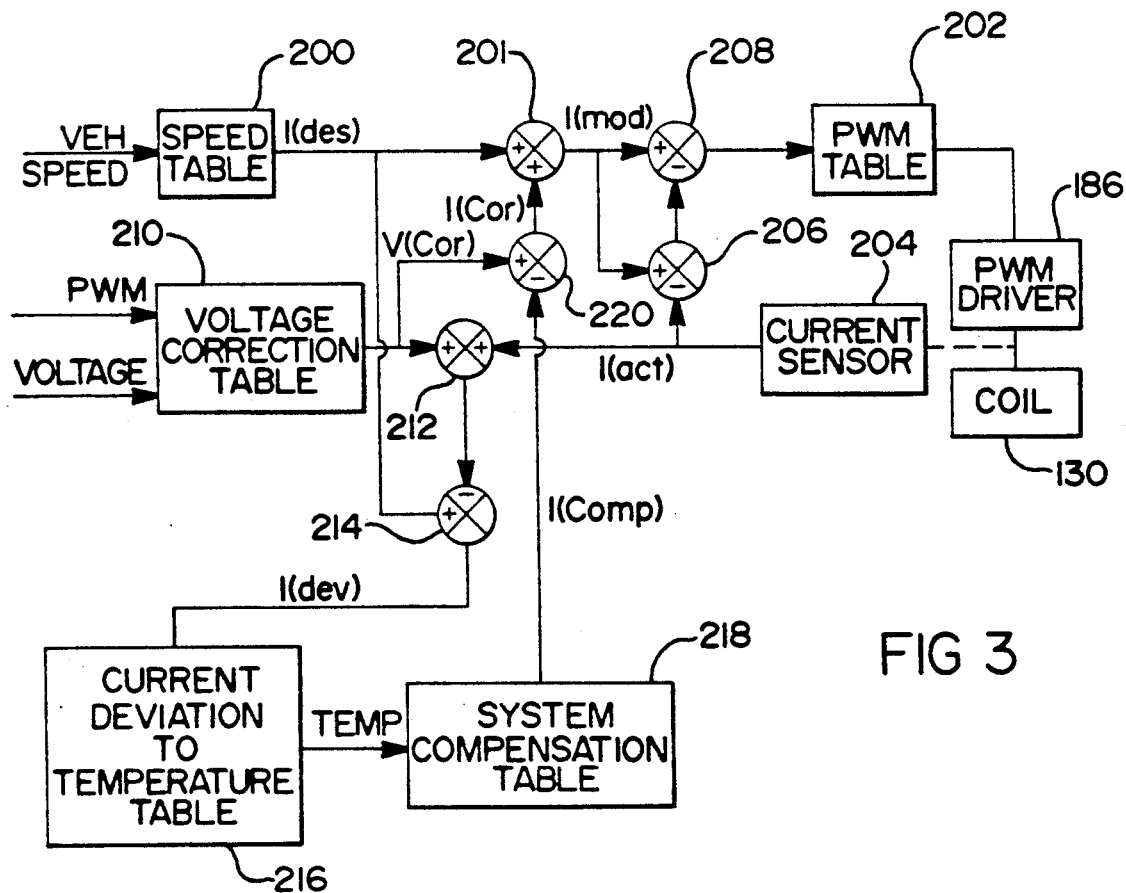
FIG. 3 is a logic diagram representing the operation of the controller of FIG. 1 according to another object of the invention.

Another embodiment of the invention achieves the temperature compensation required for consistent performance across all temperatures without using a temperature sensor. Instead of sensing temperature directly, the effect of temperature on coil current is measured and the temperature is then inferred indirectly, using empirical data on the relationship of temperature and current. With that information, the temperature compensation can be calculated. FIG. 3 shows a logic diagram for such a system which additionally includes a compensation for voltage variations, since the level of battery voltage in the vehicle has an effect on the current delivered to the excitation coil, although the voltage effect is minor compared to the temperature effect.

In FIG. 3, various sets of information are stored in the computer in a form useful for computing the indicated values; while the illustrated system indicates that the information is stored in look-up tables, the implementation of the invention is not limited to that technique. A speed table 200 determines the desired current I(des) for a given vehicle speed and this desired current is modified at a summing junction 201 to produce a modified current signal I(mod) which is used by a PWM table 202 to select the pulse width required to yield the desired actual current for nominal voltage and temperature conditions. The PWM driver 186 is energized in accordance with the selected pulse width information to deliver a current to the coil 130. A current sensor 204 (which is part of the PWM driver 186) provides an actual current signal I(act) which may differ from the desired current due to voltage and temperature effects. The actual current is compared with the modified desired current at a summing junction 206 to produce an error signal which is combined with the modified current at summing junction 208 to provide the input to the PWM table 202. A voltage correction table 210 includes information on the effect of voltage at each value of pulse width. The table is addressed by the system voltage and the output of the PWM table 202 and outputs a voltage correction factor which is combined with the actual current signal at a summing junction 212 to produce an enhanced actual current with voltage effects removed.

Any deviation of the enhanced actual current from the initial desired current (determined at the summing junction 214) is a result of temperature effects in the coil and driver. Those temperature effects are empirically determined and the temperature, as a function of the current deviation, is stored in a table 216. The current deviation I(dev) is input to the table 216 which determines the temperature. The temperature, in turn, is used to address another empirically derived table 218 which encompasses total system variances as a function of temperature and yields a compensation signal I(comp). The compensation signal I(comp) is combined with the voltage correction value in summing junction 220 to yield a final correction current I(cor), which is summed with the desired current I(des) at junction 201 to produce the modified current signal I(mod). Thus, the adjustments necessary to offset voltage and temperature variances in the system are made to result in a coil current which gives consistent power assist over a wide range of voltages and temperature. Since the deviation current I(dev) effectively represents temperature, it will be apparent that the tables 216 and 218 may be consolidated so that the compensation signal I(comp) is derived directly from the current deviation I(dev) without actually determining the system temperature.

While this invention has been illustrated with respect to the illustrated embodiments, it is expected that various modifications will occur to those skilled in the art and that steering systems incorporating such modifications may fall within the scope of this invention which is defined by the appended claims.

The embodiments of the invention in which an exclusive property or privilege is claimed are defined as follows:

1. In a vehicular power assist steering system having a pair of relatively rotatable hydraulic elements connected between a driver manipulated steering shaft and a steering gear, the hydraulic elements being adapted to generate hydraulic flow for producing power assist steering force in relation to their relative rotation, the level of power assist being subject to temperature effects in the system, apparatus for compensating for temperature effects comprising:

first and second rotary magnetic means connected respectively to the pair of rotatable hydraulic elements, the first and second magnetic means being coupled together magnetically for effecting relative rotational force on the said hydraulic elements, an excitation coil magnetically coupled to the first and second rotary magnetic means for controlling the amount of rotational force on the hydraulic elements and thus the amount of power assist as a function of the energization current, applied to the coil, and control means for sensing system parameters indicative of said temperature effects, and for said adjusting the energization current by a value which compensates said level of power assist for said temperature effects .

2. The invention as defined in claim 1 wherein the control means includes a temperature sensor for sensing a system temperature, and means for calculating the energization current as a function of the sensor temperature.

3. The invention as defined in claim 1 wherein the difference between desired current for a nominal temperature and the actual current depends on system temperature and wherein the control means has means for issuing desired current signals, means for sensing actual coil current and means for determining the difference of desired and actual currents, and includes empirically derived means responsive to the difference of desired and actual currents for yielding a compensation current.

4. The invention as defined in claim 3 wherein the empirically derived means includes a first empirically derived means for determining temperature from the difference between desired current and actual current and a second empirically derived means for yielding a compensation current based on the determined temperature.

5. The invention as defined in claim 3 wherein the coil is energized by a pulse-width-modulated signal and the coil current is dependent on both the pulse-width-modulation and the system voltage, and wherein the control means includes circuit means responsive to both pulse width modulation and system voltage to calculate a voltage correction signal, and means for adjusting the desired signal by the voltage correction signal.

6. The invention as defined in claim 1 wherein the control means includes means for sensing vehicle speed and means for adjusting the energization current to vary the level of power assist as a function of vehicle speed.

* * * * *